Sept. 10, 1940.　　　　P. M. EABY　　　　2,214,409
FISH LURE OR BAIT
Filed May 5, 1939
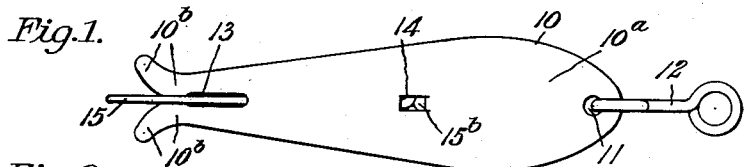
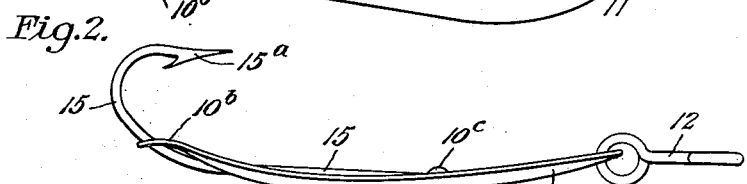
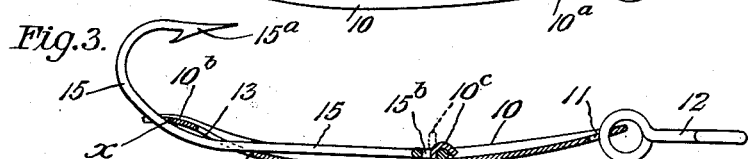
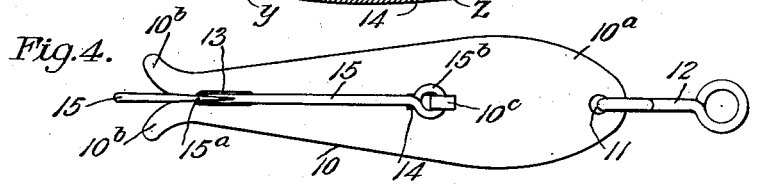
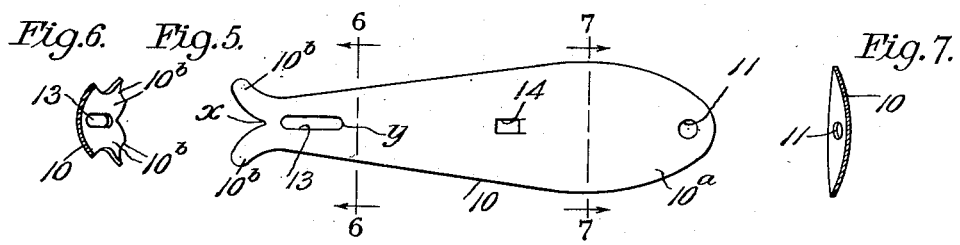
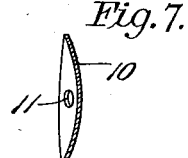
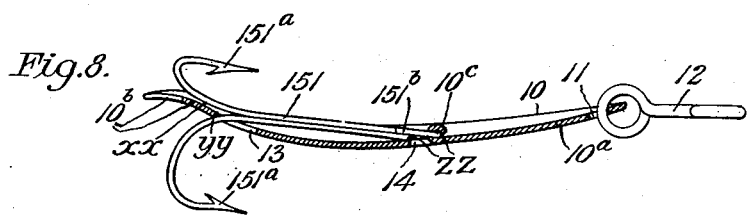
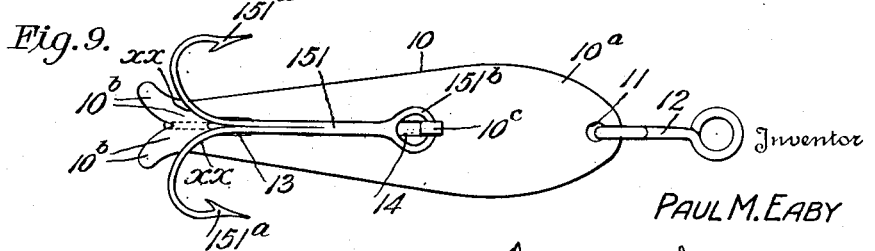
Inventor
PAUL M. EABY
By Dowell & Dowell
his Attorneys.

Patented Sept. 10, 1940

2,214,409

UNITED STATES PATENT OFFICE 2,214,409

FISH LURE OR BAIT

Paul M. Eaby, Lancaster, Pa.

Application May 5, 1939, Serial No. 272,006

4 Claims. (Cl. 43—42)

This invention pertains to fish lures or bait devices and has reference more particularly to those, or to improvements in those, of the so-called "spoon" type. It aims to provide an improved fish lure wherein the features of improvement contribute to a more efficient and a more satisfactory device.

One object of the invention is to effect a firm and positive connection of the hook part to the spoon or body part of the device, so that the two parts will be as a single rigid unit and neither can detach from or loosen to movement upon the other.

Another object is to make the hook nevertheless easily and quickly replaceable, or removable and reapplicable, by hand on the spoon, so as to permit ready repair of break or damage during use.

A further object is to produce a lure which will have a certain stability in its action in the water, so as not to spin and dart about too erratically under pull of the casting or trolling line, but simply to move from side to side and up and down more in the natural way of a small or baiting fish.

With the foregoing and other objects in view, the invention consists in the particular construction and features of the device as hereinafter more fully described with reference to the attached drawings, illustrating one practicable embodiment thereof along with one possible modification.

In said drawing:

Fig. 1 is a top plan or elevational view of the device from its convex or so-called "outer" side;

Fig. 2 is a side or edge view of said device turned with its said convex side downward;

Fig. 3 is a longitudinal section view corresponding to Fig. 2, taken substantially axially of the device;

Fig. 4 is a bottom plan or elevational view of the same device from its concave or so-called "inner" side;

Fig. 5 is a reverse or opposite plan view of the spoon or body part alone, from the convex (outer) side of the same, the hook having been removed;

Fig. 6 is a cross-sectional view of said spoon or body part, taken on the line 6—6 of Fig. 5 looking toward the tail portion;

Fig. 7 is a like view of said part, taken on the line 7—7 of Fig. 5 looking toward the nose portion;

Fig. 8 is a sectional side view similar to Fig. 3, showing a modification applicable to the use of a triple-barb hook, one of the three barbs in this instance being invisible behind the upper one seen, which bends toward the observer; and Fig. 9 is a plan view similar to Fig. 4, further illustrating said modification, the third barb of the hook in this instance being only infinitesimally seen and is therefore indicated partly in dotted lines.

Referring first to Figs. 1 to 7, the body or spoon part 10 of the device comprises a light piece of stainless-steel metal about the size and general shaping of a minnow. This piece or spoon is longitudinally arcuated substantially on the curve of a large circle, with a sharper curving, inwardly, toward the tail portion and with a reverse curving at or in said tail portion. (See Fig. 3.) It is also transversely arcuated, on the curve of a smaller circle, the degree or pitch of such curve increasing gradually from the nose toward the tail portion of the body. (See Figs. 6 and 7.) Thus it forms a thin concavo-convex body corresponding materially to the shape of the ordinary tablespoon, as will be seen by reference to the indicated drawing views.

The said spoon part is blunt at its wider forward or nose end portion 10ª, in which a hole or other opening 11 is punched to receive a connecting link or swivel 12 for attachment to the end of a fishing line. Its tail or tapering rearward portion is extremitally flared and bifurcated to give it a form in semblance of the caudal fin of a fish, comprising the portions 10ᵇ, 10ᵇ. Forward of this extremital tail bifurcation is an elongate slot opening 13, slightly wider than the shank of the hook to be applied to the spoon. This is formed preferably by punching or cutting out the metal from the convex toward the concave side of the body so as to give the longitudinal edges of said slot opening at the same time a slight inward depression or lipping in the manner of a groove, which affords a certain advantage, although it is not actually necessary to do it in said way or to impart any grooving character to said opening. Intermediately of the spoon body is another opening or perforation 14 formed here by punching out the material of said body, from the convex toward the concave side thereof, so as to provide a lug or finger 10ᶜ extending upwardly from the concave side or face of the body, initially straight out at right angles thereto as indicated in dotted lines in Fig. 3.

The hook part 15 applied to or mounted on the described spoon element comprises essentially the ordinary hook purchasable on the market, having the usual barb 15ª at one end and the usual fastening eyelet 15ᵇ at the other. This hook is attached and secured in place with its shank extending longitudinally over the concave (inner) side of the spoon through its tail portion to the convex (outer) side thereof and with its hook or bent portion curving upwardly back and over said concave side. It is applied by passing the eyelet and shank sidewise through the slot opening 13 from the convex to the concave side of the spoon, and engaging said eyelet over the lug or finger 10c by a 90° turn or rotation bringing its hook portion (curving upwardly) into the detent or apex of the tail bifurcation between the portions 10b, 10b. It is then drawn forward until its said hook portion fits tightly into said apex with a pressure bearing against the spoon edge at the point $x$ (see Fig. 3.) Simultaneously it is depressed, against the concave side of the spoon, with its shank portion pressing against the lower edge of the aforesaid slot opening at the point $y$ (see Fig. 3) and with the forward part of the eyelet pressing against the surface of the spoon at the point $z$ (again see Fig. 3). While held thus tensioned against the spoon body, contacting at the three points mentioned, the said lug or finger 10c is bent or swaged down tightly over and partly around the eyelet (Fig. 3) so as to fasten the hook in place. Thus said hook is firmly and positively secured and held in place, with a "sprung" relation to the spoon, so that it cannot become detached or loosen to movement or wobbling. It becomes in effect a rigid part of the unit, in which the spoon part itself is rigid by reason of its form and metallic composition. Yet the combined parts in unitary structure are exceptionally light as well as strong.

The position of the hook almost entirely on the concave side of the spoon throws the center of gravity toward that side and gives the lure a certain stability in its action in the water, to which the shaping of the spoon and the ruddering effect of the hook also contribute in some measure. Said lure rotates or revolves with a side to side and an up and down movement in a somewhat helical path as it is drawn through the water, but both the rotational and sidewise movements are moderated and not too erratic and the device does not spin or dart about vigorously in the fashion common to many devices of the kind. Hence it moves along more in the manner natural to small baiting fish and rotates only enough to flash and attract the eye of the baitable or prey fish.

Referring now to the modification of Figs. 8 and 9, the described device and improvement features may be embodied in a double or a triple hook structure in substantially the same way. In these last two figures a triple hook 151 having the three barbs 151a and the eyelet 151b is shown substituted for the single hook of the preceding views. Two of the three barbs extend laterally and upwardly back over the concave side of the spoon (see Fig. 9) and the third extends coaxially and downwardly back over the convex side of said spoon (see Fig. 8) which is identically the same. In attachment, this triple hook is applied to place by passing the barb of the third hook portion through the slot opening 13 from the concave to the convex side of the spoon (which can most conveniently be done from a position in line with the extended axis of the spoon) and swinging the shank around so as to engage the eyelet 151b over the spoon lug or finger 10c. Then, drawing the hook backward or forward until the hook portions of the first two barbs press tightly upon the tail portions 10b, 10b of the spoon at the points $xx$ and the hook portion of the third barb bears tightly against one end of the slot opening 13 as at the point $yy$, and simultaneously depressing the shank with the forward part of the eyelet or the shank end of the third hook portion pressing against the surface of the spoon as at the points $zz$, the said spoon lug or finger 10c is bent or swaged down tightly over and partly around the eyelet as described with reference to the single hook. Thus, with retaining and steadying pressure at the three points indicated, the hook is fastened securely to the spoon in a "sprung" relation thereto.

The advantages of the fish lure or bait of this improved form and construction will undoubtedly be appreciated. Aside from its rigidly unital nature preventing loosement or coming apart, it is sturdy and strong enough to withstand heavy strains or loads upon it, and at the same time is unusually light in weight. Any repair, or replacement and substitution, of the hook part can be made readily and easily on the spot during use by simply raising the fastening lug or finger and applying the new hook as described. This lure has the added advantage that a broken hook can be removed and replaced with ease and expedition, without necessity of any special tool or the removal of any other part.

It will be understood that various minor changes may be made in the form and arrangement or assembly of the parts and that the same may be employed in various modificational constructions without departing from the spirit and scope of this invention. Therefore, it is not intended to limit the invention to the specific form or forms illustrated herewith, nor otherwise to impose any limitations thereon other than may be required by the prior art or as are specifically set forth in the appended claims.

Having thus described my invention, what I claim as new and desire to secure by Letters Patent of the United States is:

1. A fish lure or bait, comprising a spoon body of sheet metal having the general shaping of a fish including a bifurcated tail portion in semblance of the caudal fin, the said body being arcuated longitudinally and transversely on the same side with a reverse longitudinal arcuation in the tail section thereof and being provided with means at its nose for attachment to a line, a longitudinal slot somewhat forward of the bifurcated tail portion and a lug on its intermediate portion between said attachment means and said slot, and a hook including one or more barbs and having a fastening eyelet on its shank end, said hook being secured upon said spoon body on the concave arcuated side thereof by the passage of its eyeleted shank end through said slot from the convex to the concave arcuated side of the body with a curved barbed end backwardly overextending the same and by the engagement of said lug through and downwardly over said eyelet thereof, with a curved portion of the hook bearing tensionally in one direction against the bifurcated tail portion of the spoon body, with another portion of the hook bearing tensionally in an opposite direction against one end of said slot in the body and with a third portion of the hook bearing upon the surface of the body adjacent to the lug, thereby holding the hook in a three-point spring-tensioned relation to said body.

2. A fish lure or bait, comprising a spoon body of sheet metal in the general shaping of a fish having a bifurcated tail portion in semblance of the caudal fin, the said body being arcuated longitudinally and transversely on the same side with a reverse longitudinal arcuation in the tail section thereof and being provided with means at its nose for attachment to a line, a longitudinal slot opening somewhat forward of the bifurcated tail portion and a lug on its intermediate portion between said attachment means and said slot, and a hook consisting of an ordinary curved barbed wire element having a fastening eyelet on its shank end, said hook being secured upon said spoon body on the concave arcuated side thereof by the passage of a portion of its shank extensionally through said slot opening from the concave to the convex arcuated side of the body with its barbed end backwardly overextending the same and by the engagement of said lug through and downwardly over said eyelet, with a curved portion of the hook pressing in one direction against the bifurcated tail portion of the spoon body within the bifurcation thereof, with another portion of the hook bearing in an opposite direction against one end of said slot opening in the body and with a third portion of the hook pressed upon the concave surface of said spoon body adjacent to said lug in an opposite side spring-tensioned hold to the body.

3. A fish lure or bait, comprising a spoon body of sheet metal in the general shaping of a fish having a bifurcated tail portion in semblance of the caudal fin, the said body being arcuated longitudinally and transversely on the same side with a reverse longitudinal arcuation in the tail section thereof and being provided with means at its nose for attachment to a line, a longitudinal slot opening somewhat forward of the bifurcated tail portion and a lug on its intermediate portion between said attachment means and said slot opening, and a hook consisting of a conventional triple hook arrangement having barbs on three curved ends and a fastening eyelet on the other straight or shank end, said hook being secured upon said spoon body on the concave arcuated side thereof by the passage of one of its branch portions extensionally through said slot opening from the concave to the convex arcuated side of the body with its barbed end backwardly overextending the same and by the engagement of said lug through and downwardly upon said eyelet, with the other two branch portions of the hook bearing in one direction tensionally upon the bifurcated tail portions of the spoon body and their barbed ends also backwardly overextending the same, with another portion of the hook pressing in an opposite direction against one end of said slot opening and with a third portion of the hook bearing upon the surface of the spoon body adjacent to said lug in a three-point spring-tensioned hold relation to said body.

4. A fish lure or bait according to claim 1 wherein the arcuation of said spoon body part is carried into and throughout the tail, the longitudinal arcuation being on the curve of a large circle diminishing gradually into the curve of a smaller circle from the nose toward the tail and being reversed only at or in the actual tail section, and the transverse arcuation being increased gradually from the nose to the tail.

PAUL M. EABY.